United States Patent [19]
Blazquez

[11] Patent Number: 5,259,571
[45] Date of Patent: Nov. 9, 1993

[54] AIRCRAFT WITH GYROSCOPIC STABILIZATION SYSTEM

[76] Inventor: Jose M. R. Blazquez, Gobelas, 11, 28023 Madrid, Spain

[21] Appl. No.: 844,499

[22] Filed: Mar. 3, 1992

[30] Foreign Application Priority Data

Mar. 6, 1991 [ES] Spain ............................ 9100563

[51] Int. Cl.$^5$ ............................................. B64C 15/00
[52] U.S. Cl. ............................ 244/12.2; 244/236; 244/165; 74/573 F
[58] Field of Search ............ 244/12.2, 236, 79, 165; 74/573 F

[56] References Cited

U.S. PATENT DOCUMENTS

| | | | |
|---|---|---|---|
| 2,856,142 | 10/1958 | Haviland | 244/79 |
| 2,980,363 | 4/1961 | Schonstedt | 244/79 |
| 3,051,414 | 8/1962 | Frost | 244/12.2 |
| 3,537,669 | 11/1970 | Modesti | 244/23 C |
| 3,862,732 | 1/1975 | Wyatt et al. | 244/165 |
| 4,014,483 | 3/1977 | MacNeill | 244/23 C |
| 4,109,549 | 8/1978 | Vincent | 74/573 F |
| 4,214,720 | 7/1980 | DeSautel | 244/23 C |
| 5,026,008 | 6/1991 | Lurie et al. | 244/165 |

Primary Examiner—Robert J. Oberleitner
Assistant Examiner—Christopher P. Ellis
Attorney, Agent, or Firm—Helfgott & Karas

[57] ABSTRACT

An aircraft of the heavier-than-air type driven by reactors includes a fuselage of a lenticular configuration, a central shaft, and two rotary discs rotating in opposite directions and provided with large masses of inertia displaced or diplaceable toward the periphery thereof. The discs rotate about the central shaft driven by the reactors and turbines associated thereto, determining a gyroscopic effect which renders the aircraft stable. The base of the fuselage has a middle longitudinal hollow where the reactors are located. Two vertical rudders are positioned in front of and behind the fuselage and a horizontal depth aileron extends from the rear extension of the fuselage body.

13 Claims, 5 Drawing Sheets

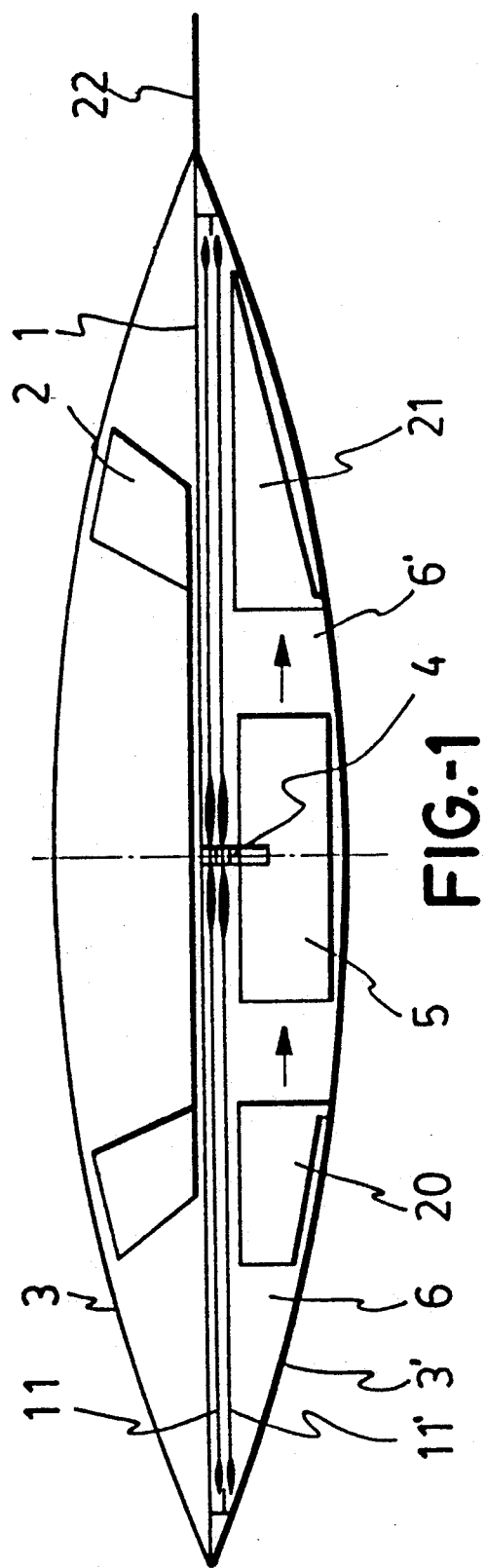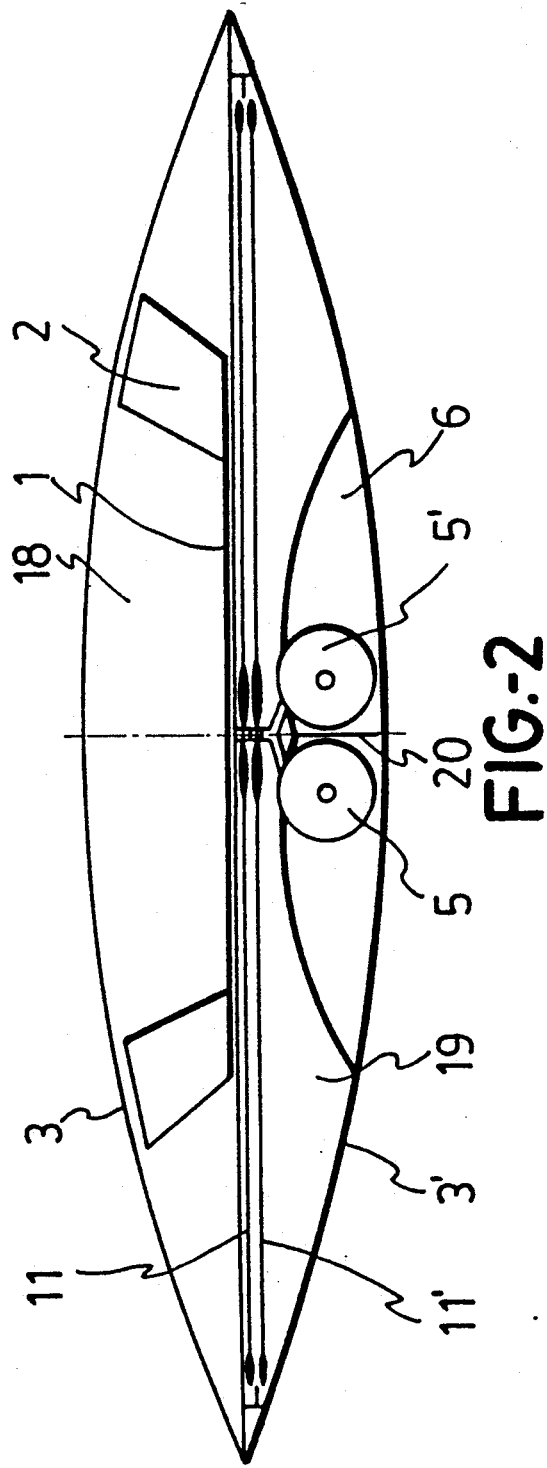

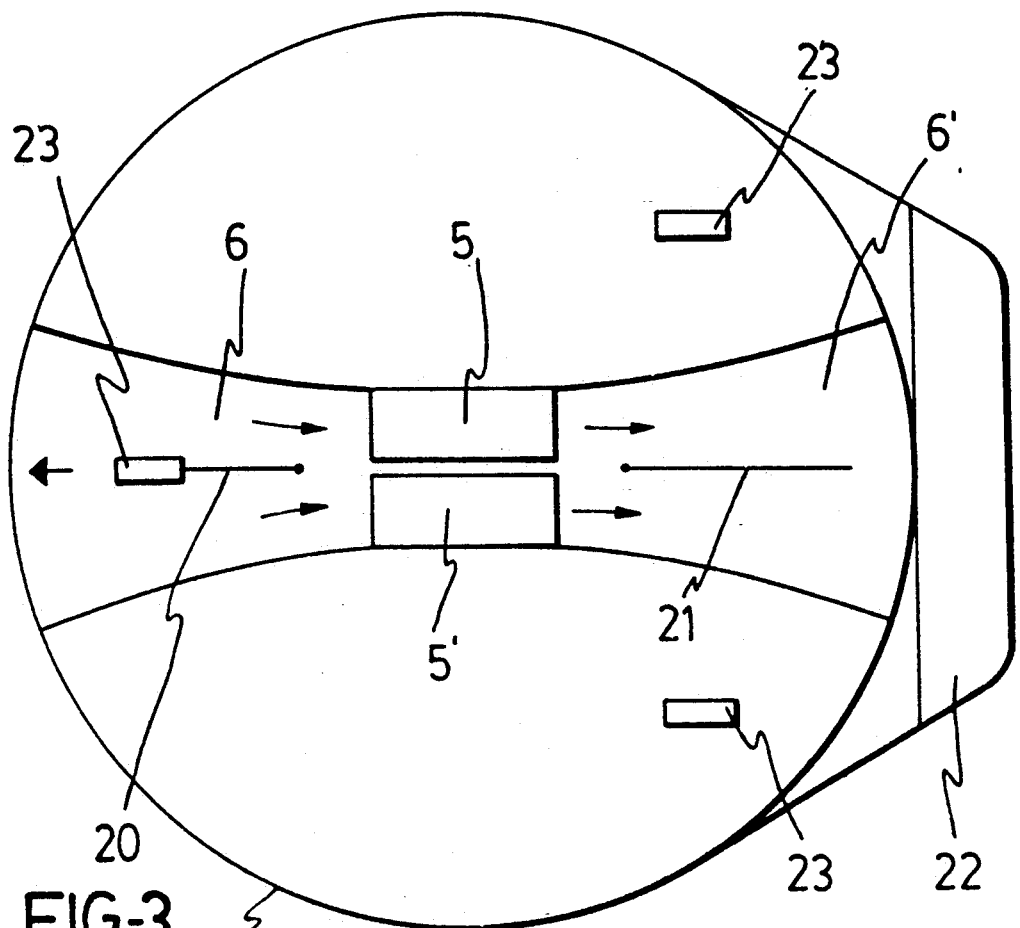
FIG.3
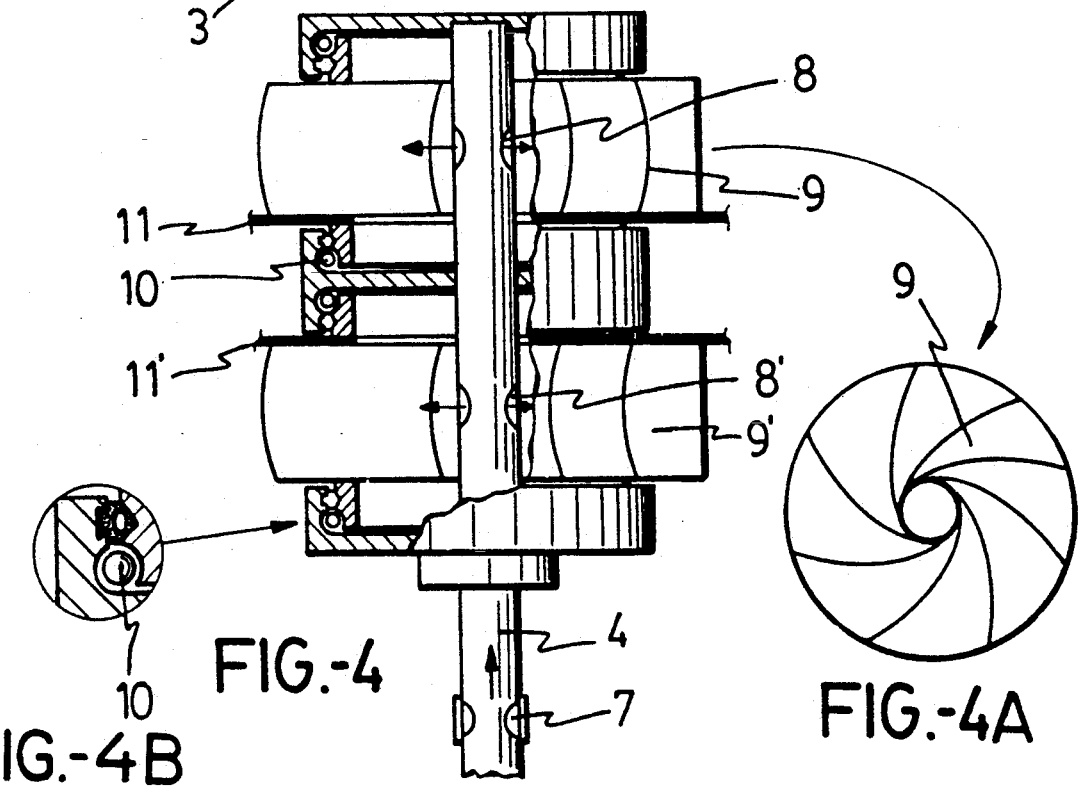
FIG.-4
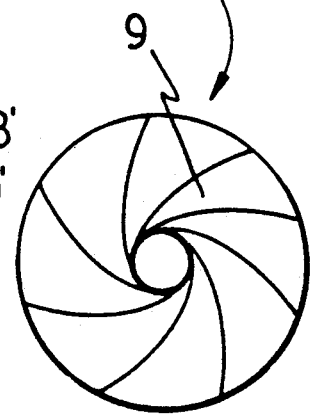
FIG.-4A
FIG.-4B

AIRCRAFT WITH GYROSCOPIC STABILIZATION SYSTEM

FIELD OF THE INVENTION

The present invention relates to an aircraft and specifically a heavier-than-air aircraft, i.e. of the type whose lift is due to aerodynamic forces, which is based upon a new structural concept to allow greater speeds to be reached with a lower fuel consumption and a smaller risk of accidents than in conventional aircraft of this kind.

BACKGROUND OF THE INVENTION

It is a fact that in the field of aeronautics there are primarily two kinds of aircraft, lighter-than-air craft which are supported in the air by flotation forces, for instance airships and so on, and heavier-than-air craft, which are lifted by aerodynamic forces, among them aeroplanes, helicopters and so on.

The principal difference between these two kinds of aircraft resides in that whilst the former two need no wings, the latter, as currently conceived technologically, must carry such wings to produce aerodynamic forces that will allow a body heavier than air to be airborne and the aircraft to be trimmed; this so far as aeroplanes are concerned, for helicopters use a completely different supporting system, the renowned propeller that is very specific in its use, for albeit advantageous from the standpoint of vertical take-off and landing, its performance as to load capacity and speed is very low as compared with the performance of aeroplanes.

Nevertheless, in the field of aeroplanes, their performance with regard to consumption and speed and risk of accidents is far from what would in theory be considered optimal. This is due to their actual configuration, for though it has the best aerodynamic features known to date in practice, these are far from satisfactory precisely because of the existence of a central body, the useful portion of the aircraft, to which large-sized wings must be attached.

From the theoretical standpoint, the ideal solution would be to have a markedly lenticular aircraft with no wings, for this configuration yields the best aerodynamic performance. However, it has heretofore been impossible to design an operative aircraft of this type because such configuration is problematic when it comes to keeping it balanced in space, and these problems have not been overome till now.

SUMMARY OF THE INVENTION

It is an object of the present invention to provide an aircraft of the heavier-than-air kind, i.e., of the kind lifted by aerodynamic forces, specifically by the aerodynamic forces generated by one or two reactors, which is designed and structured in order to take up a lenticular configuration to fully solve the trimming problems.

More specifically and in order to achieve the above object, the aircraft having the lenticular configuration, particularly in respect of its fuselage, is provided with two inside compartments, upper and lower, defined by a partition wall provided at its medial plane. The upper compartment is designed to house a control cabin and a passenger and/or load area and the lower compartment houses the reactor or reactors, an unavoidable undercarriage, a fuel tank or tanks and means providing the aircraft with the stability or trim required, these being the essence of the invention. More specifically, the trimming means comprise two rotatory discs that turn in opposite directions about a medial vertical shaft coupled to the reactor or reactors, the discs having a large that must weigh at least as much as the rest of the aircraft, with the fuel and load, so that the large mass of these discs may jointly with its rotatory movement in opposite directions define a gyroscopic effect that in turn determines perfect stability or trim of the aircraft in space, as well as a large inertial force.

In order to expedite a high revolution rate for the rotatory discs in a short period of time, supplying as little energy as possible, each of the discs is designed to actually comprise two annular tanks, one at the periphery thereof and another close to the shaft, having the same volumetric capacity and housing a high density liquid, for instance mercury, which when the aircraft is at rest will remain in the internal annular tank, for the inertia upon rotation of the disc to be minimal, and as the disc increases its speed and due to the centrifugal force, gradually moves towards the periphery thereof where it will remain while the aircraft is working in order to achieve the maximum gyroscopic effect.

once the aircraft has stop the liquid will be led by any means back to the internal annular tank, whereupon the previous operative cycle may be repeated upon take-off.

Though this is the preferred solution it is also possible for the masses of the discs to be fixed and obtained for example, with lead, which is clearly cheaper than mercury, disposed on the periphery of each disc, which cost reduction entails a reduced performance of the aircraft, for it is slower starting and uses up more energy.

The gyroscopic effect can also be attained by means of a single disc, with either a fixed or a mobile mass. This solution is scarcely satisfactory because when two discs are used the resulting inertia due to the rotation is in opposite directions, is nil.

The discs are associated with respective turbines, provided with blades oriented in different directions, and operation thereof takes place at the expense of the actual aircraft reactor or reactors, from which intake is effected through the actual hollow shaft about which the turbine-disc assemblies rotate through the relevant bearings.

It has been foreseen that the shaft has an emergency air intake in case the reactors break down, in order that the rotatory movement of the discs can be maintained in such event, whilst the compressed air that reaches the turbines, usually from the reactors, is duly funnelled out of the rear portion of the aircraft either through the internal part or the internal part of the aircraft; as appropriate to the operation to be effected from time to time.

The partition platform, the shaft and the lower reactor or reactors form a rigid, one-piece assembly to which the fuselage, made of a light aluminium type material, is coupled, thereby rendering the aircraft of lenticular configuration.

Though the aircraft's operations are effected by regulation at the chutes that lead to the reactor or reactors, which chutes are mobile in order for the flow to be guided in the required direction, the lower-portion thereof has two vertical rudders just in front of and behind the reactor or reactors, whilst at the rear end of the aircraft its lenticular body extends into a depth aileron that is horizontally disposed and linked by a transverse shaft.

The fuel tanks will be located at the sides of the reactor or reactors, symmetrically disposed and as close as possible to the aircraft's center which coincides with the gyroscopic spin axis of the discs.

The undercarriage comprises three arms, one forward and two rear, similar to those of aeroplanes and which can be actuated by a hydraulic system as in the latter.

According to another characteristic of the invention and in order to improve the aircraft's control system, the control is designed to be effected by duly acting upon the rotatory discs provided in the aircraft whose function is that of a gyroscope, thereby to attain both depth and warping movements, all based upon the notion that when a force is applied at any point of the periphery of a gyroscope the resultant thereof is displaced 90° in the direction of rotation.

The forces applied to the discs can be hydraulic, pneumatic or mechanical, obviously acting in opposite directions on both discs at all times, because the discs also rotate in the opposite directions, and the forces are applied at the exact spot depending on the operation that is to be carried out, to which end such forces must obviously be controlled from the aircraft's control cabin, both as to size and direction and the points at which they are applied.

In light of the foregoing, a secondary problem in the discs that act as gyroscopes is that they must not be affected by any destabilizing force and therefore such discs, instead of taking up a slightly lower position with regard to the symmetrical medial horizontal lane, must take up symmetrical positions at either side of the plane in order to attain the trim sought, at the same time as the leading edge of the fuselage, i.e., the front portion of the aircraft must be curved in order not to affect the movements of the gyroscopes.

Furthermore, the reactor or reactors must be positioned such that the drive is always parallel to the discs, and in this sense a simple solution consists in that the reactors adopt symmetrical positions with respect to the discs.

With the structure described, fuel consumption is lower due to inertia and planing and a greater speed, and the risk of accidents is smaller because of inertia and aerodynamics of the structure.

BRIEF DESCRIPTION OF THE DRAWINGS

FIG. 1 is a diagrammatic cut-off side elevation view of an aircraft in accordance with the present invention;

FIG. 2 is a diagrammatic front elevation view of the aircraft of FIG. 1;

FIG. 3 is a lower plan view of the aircraft;

FIG. 4 is a partially cut-off side elevation of the shaft bearing the turbines to which the respective gyroscopic discs are coupled;

DESCRIPTION OF THE PREFERRED EMBODIMENTS

Figure 5:
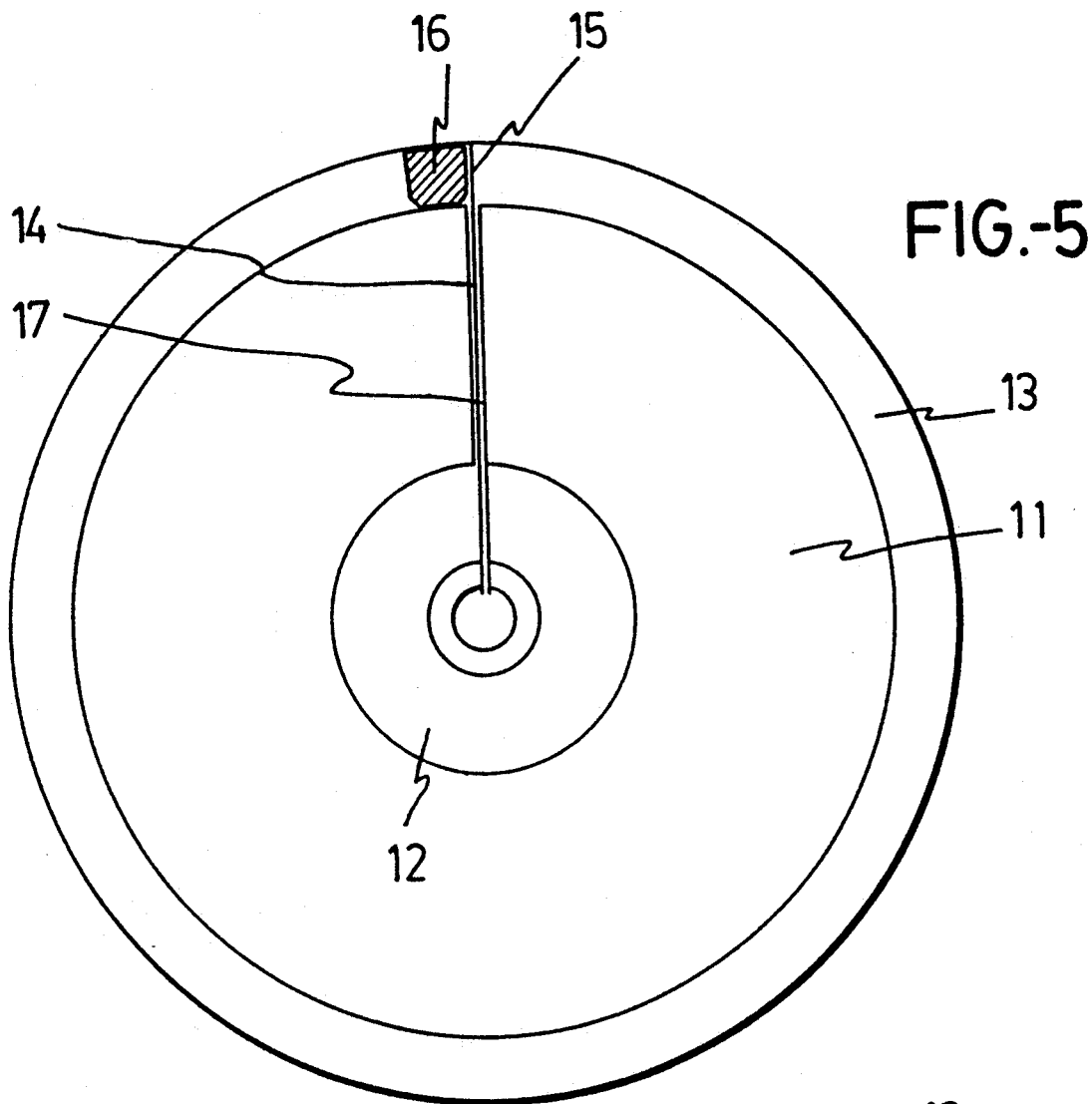
FIG. 5 is a plan diagrammatic view of one of the discs according to the preferred embodiment where mobile masses are incorporated.

Referring firstly specifically to FIGS. 1, 2 and 3, it can be seen that the aircraft, subject of the invention, comprises a circular platform (1), on the upper surface of which is provided an annular structure (2) supporting the upper half (3) of the fuselage. Coupled to the center of the lower surface of the platform is a shaft (4) that is in turn rigidly connected to a pair of reactors (5-5') that are symmetrically located very close to the vertical, longitudinal and medial plane of the aircraft, to which reactors is in turn coupled the lower half (3') of the fuselage, such that the aircraft as a whole and through the fuselage (3-3') takes up the lenticular configuration shown in the figures.

Obviously, and as is in turn shown in FIG. 3, the lower area (3') of the fuselage at the reactors (5) has a hollow (6) for air to reach the reactors (5) and an outlet hollow (6') shaped aerodynamically.

More specifically, and as shown in FIG. 2, the shaft (4) branches off at its lower end to be coupled to the two reactors (5-5') and shown in FIG. 4, is hollow so that compressed air is taken through the same from the reactors, controlled by means of a choke (7) and that leaves radially through the upper area of the shaft (4) at two different levels, through holes (8) and (8') to reach respective opposed turbines (9-9'), i.e., structured to rotate in opposite directions about the shaft (4), specifically through bearings (10). Respective discs (11-11') are coupled to the turbines (9-9') to rotate in opposite directions driven by the air pressure from the reactors.

Figure 6:
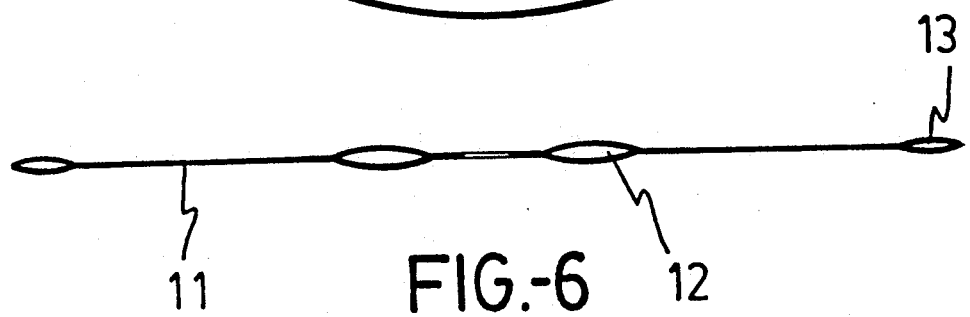
FIG. 6 is a diametrically cut-off diagrammatic profile of the disc shown in FIG. 5.

More specifically, as shown in FIGS. 5 and 6, each of the discs (11-11') comprises an almost laminar body of strength, as numbered where two annular tanks are defined, one being internal (12) and the other external (13). The volume of the tanks is the same and the tanks are connected to each other by means of a radial communication duct (14) that leads into the external annular tank at a radial partition wall (15) next to which is a mobile stopper or piston (16) in an emptying position for the tank (13), when the annular tank (12) is filled with a high density liquid, for instance mercury. In this position, where the aircraft is at rest, the considerable mass of the discs (11), whose weight must be equal to or greater than the rest of the aircraft, is concentrated close to the spin axis coinciding with that of the shaft (4), and therefore little effort is required to "start" discs, whilst as the rotation speed increases, the fluid is radially displaced by centrifugal forces going through the conduit (14) to the external annular tank (13) and causing displacement of the mobile piston (16) toward the opposite face of the partition wall (15), which it reaches once the fluid has been wholly transferred, whereupon the discs take up the best functional conditions from the gyroscopic standpoint, since their mass is established on their periphery.

When the aircraft stops and in order that the discs be at their best condition with a view to a new "start", compressed air is introduced between the partition wall (15) and mobile piston (16) through an auxiliary conduit

(17) forcing the piston (16) to move in the opposite direction, specifically towards the initial position shown in FIG. 5, the piston therefore forcing the fluid toward the internal annular tank (12), without there being any contact between the fluid and the air.

Nevertheless, the discs (11-11') can have fixed masses, and there can even be a single disc.

According to the structure described, inside the fuselage (3-3') and by means of the circular platform (1) there are two compartments, an upper (18) compartment designed for the aircraft's control cabin and for the passengers and/or load, and a lower compartment (19) housing the reactors (5), and where the fuel tanks will be located, as close as possible to the center of gravity of the aircraft, that coincides with the shaft (4). Two vertical ailerons or rudders (20) and (21) are located at the vertical, longitudinal and medial plant of the aircraft, just in front of and behind the reactors (5-5'), the lenticular body extending at the rear, at the plane corresponding to the platform (1), into a depth aileron (22), which is obviously horizontal.

Evidently, the undercarriage (23) is also located on the lower surface of the aircraft, to be acted upon by a conventional hydraulic system.

It should also be noted that the hollow shaft (4) not only represents a duct for the driving fluid for the turbines (9-9'), but also communication is established through the shaft between the control cabin and the reactors, the undercarriage, the ailerons, and so forth.

Figure 7:
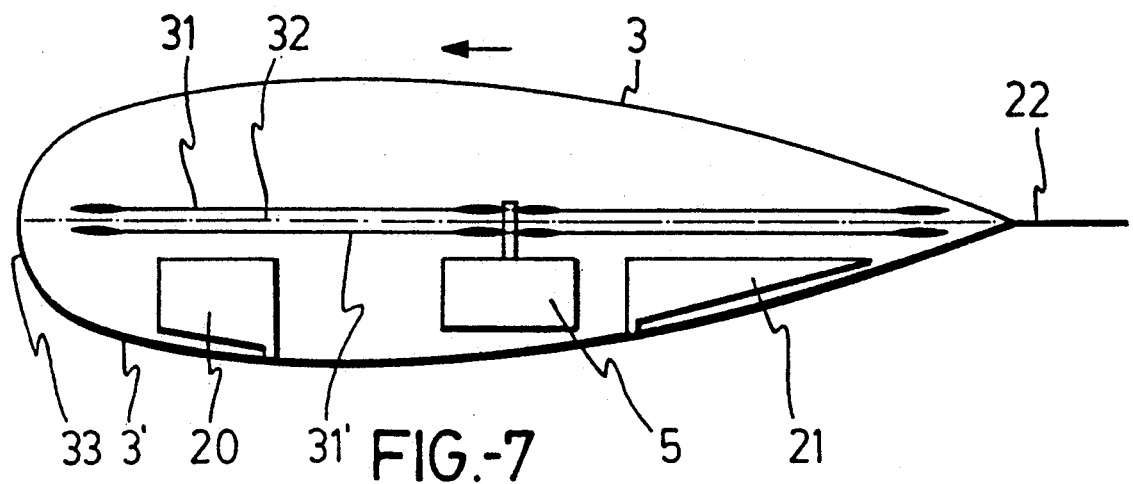
FIG. 7 is a diagrammatic cut-off side elevation of the aircraft of a different embodiment of the invention.
Figure 8:
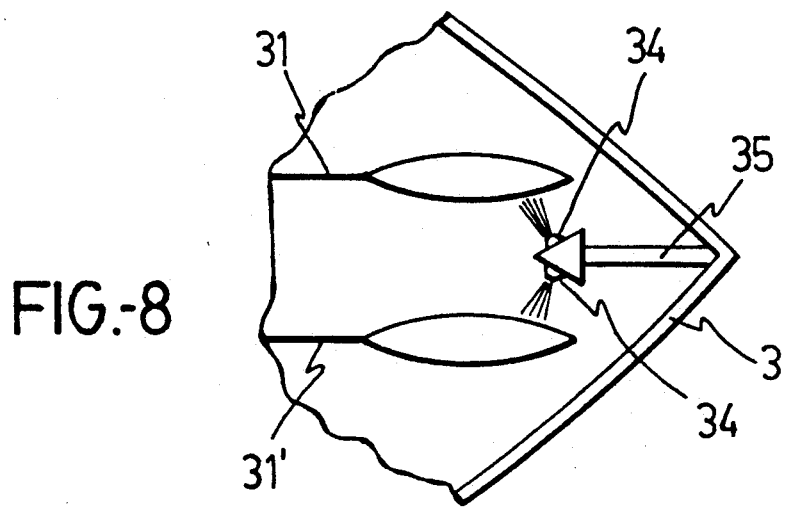
FIG. 8 is an enlarged diagrammatic view of the device acting upon the gyroscopic discs to control warping and depth in the aircraft shown in the FIG. 7.
Figure 9:
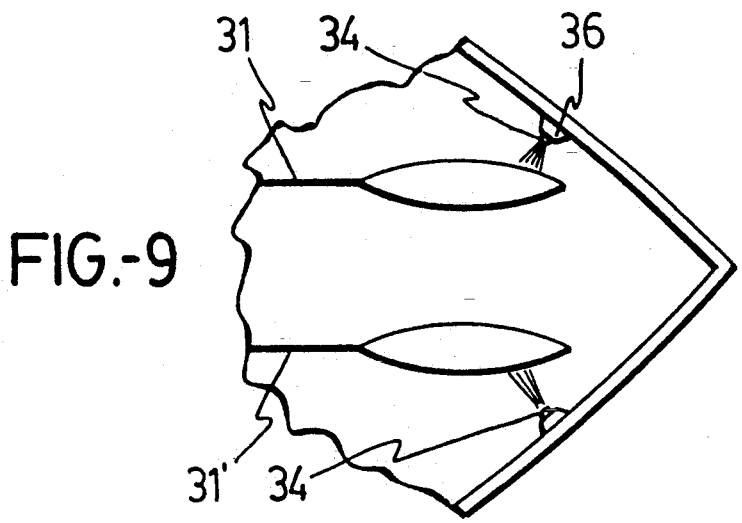
FIG. 9 is an enlarged diagrammatic view of the second embodiment of the control device acting upon the gyroscopic discs.

According to the embodiment shown in FIGS. 7 to 9, the gyroscopic discs (31-31') constituting the gyroscopic elements that stabilize the aircraft, are positioned symmetrically with respect to the imaginary medial or symmetrical plane (32) of the fuselage (3-3'), which is especially clear in FIG. 7, the front portion or leading edge (33) of the fuselage being moreover rounded in order not to affect the moments of the gyroscopes defined by the discs (31-31').

The effect of the discs or gyroscopes (31-31') must only be induced, in other words voluntary, specifically to achieve the aircraft's warping and depth control system, which takes place by exerting equal forces in opposite directions upon 31-31'), which forces must be in opposite directions, because the discs also rotate in opposite directions.

The force can be mechanical, hydraulic or any other suitable force, and according to a given preferred embodiment, the system can comprise a number of nozzles (34) mounted by pairs on respective supports (35) fixed to the fuselage (3) at the aforesaid medial plane (32) thereof, as shown in FIG. 8, such that the nozzles (34) are oriented toward the faces that in turn face the discs (31) and (31') at the periphery thereof, the nozzles having electrically operated valves controlled from the aircraft's control cabin, so that, depending on the particular operation to be effected, the electrically operated valve or valves corresponding to the respective nozzles (34) will be opened in order to achieve a destabilizing force upon the discs (31) and (31'), leading to the operation sought and for the time required for the operation to be effected.

Among the many practical embodiments of the system, that shown in FIG. 9 is also possible with independent supports (36) for each nozzle (34), the supports (36) being located above and below the discs (31) and (31') obviously to achieve the same effect as above.

Figure 10:
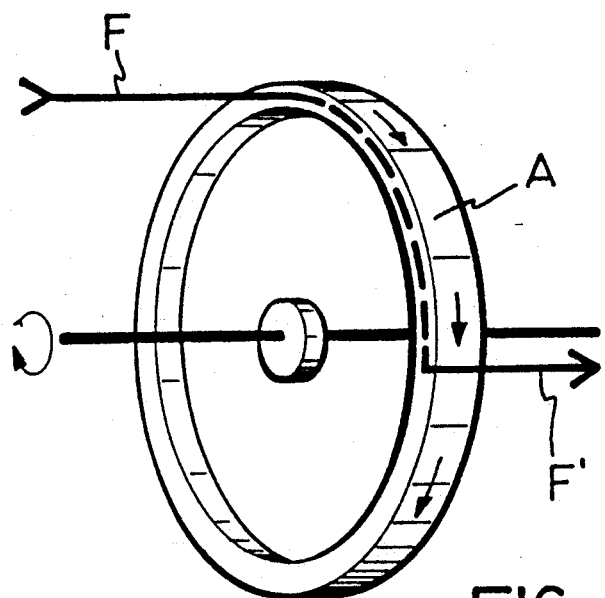
FIG. 10 is a diagram showing the forces on a gyroscopic disc in accordance with the effect achieved by the control device of FIGS. 8 and 9.

In any control operation it is necessary to bear in mind that as aforesaid and as shown in FIG. 10, when a force F acts upon a gyroscopic wheel A; the resultant F' is at 90° to the former.

Figure 11:
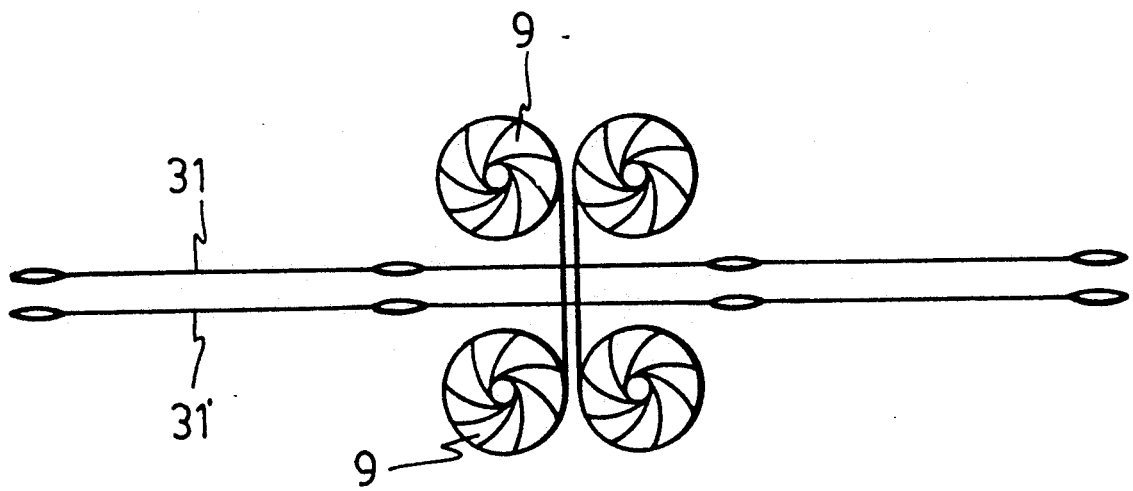
FIG. 11 shows an example of the location of the reactors specifically in the event of four reactors, in order to achieve a suitable trim with respect to the gyroscopic discs, i.e., a thrust parallel to the latter.

Finally, as described above, the discs (11-11') or (31-31') must not be subject to any destabilizing effect or force that is not duly controlled from the aircraft's control cabin, for which reason and in addition to the curved shape of the aircraft's leading edge (33), the reactors (9) or as appropriate the rockets, must be positioned so that the drive be always parallel to the discs, and therefore such reactors (9) can take up the position shown in FIG. 11, specifically a position of symmetry with regard to the discs (31-31').

Since the discs act as a warping and depth control system, the rear horizontal balancing flap (22) must be kept fixed, acting only as a stabilizer, whilst the vertical rudders (20) and (21) are still mobile to change the steering gear.

The aircraft shall also be provided with an erector system so that the discs are kept horizontal at all times, there being many solutions to this end, for instance a number of connectors or hubs located in a container full of water, some of which will obviously lose contact with the water when the aircraft moves away from its horizontal position.

Though this description has been made based upon the use of reactors, rockets could be used without this affecting the essence of the invention.

I claim:

1. An aircraft of the heavier-than-air type, comprising a fuselage body of a substantially lenticular configuration and accommodating operative elements of the aircraft; a central longitudinal vertical shaft positioned in said body; driving means positioned in a hollow lower part of said body and including drive reactors and at least two turbines operatively connected to said reactors and driven thereby, said turbines being positioned on said central shaft which is connected to said reactors to be rotated thereby, each turbine being mounted on said central shaft with freedom of rotation via bearings; and two substantially planar gyroscopic discs positioned on said shaft and each extending in a horizontal direction and having a large mass of inertia at a periphery thereof to provide stability, each disc being coupled to a respective turbine, said turbines having vanes constructed so that the turbines rotate in opposite directions causing the respective discs coupled thereto to rotate in opposite directions.

2. An aircraft according to claim 1, wherein each gyroscopic disc includes a substantially planar body of a circular cross-section, having a first external annular tank at an outer periphery thereof and a second internal annular tank at a central part thereof, each tank having the same capacity and being in communication with each other via a radially extending duct and each accommodating a high density liquid the volume of which is the same for each tank so that when, at a rest state, said liquid is located in said internal annular tank the disc has no resistance to a rotary acceleration whereas, at a rotation state, the liquid is displaced by a centrifugal force towards said external tank via said radial duct thus enhancing a gyroscopic effect of the disc to a maximum.

3. An aircraft according to claim 2, wherein said liquid is mercury.

4. An aircraft according to claim 3, wherein each disc includes an auxiliary duct to supply compressed air and said external tank has a partition wall at a mouth of said radial duct and a piston movable within said external tank by said liquid as said liquid is transferred from said internal tank to said external tank, said piston driving said liquid back from said external tank to said internal tank when compressed air is supplied to said external tank so that said piston prevents contact between said air and said liquid.

5. An aircraft according to claim 4, wherein said central shaft is hollow and has radial holes opposite to and opening into each turbine, said shaft being branched into two branches leading to and coupled at an end portion thereof to respective reactors to convey compressed air from said reactors to said turbines to rotate said turbines, said central shaft further including a direct auxiliary air intake and said turbines having ducts for air guided towards a rear of the aircraft to maintain rotation of said discs and stability of the aircraft in case of breakdown of said reactors.

6. An aircraft according to claim 1, and further comprising a horizontal platform in the middle of said body, two vertical rudders positioned in said hollow lower part of said body, and a horizontal depth aileron configured as a rear extension of said platform.

7. An aircraft according to claim 6, wherein said fuselage body further includes a cap positioned above said platform and connected to said platform and defining with said platform an upper chamber which accommodates a control cabin and passenger and load compartments, said lower part of said fuselage body defining a lower chamber to accommodate fuel tanks and an undercarriage having three arms.

8. An aircraft according to claim 7, a further comprising a control system including means to apply forces to said discs as said gyroscopic discs rotate in opposite direction.

9. An aircraft according to claim 8, wherein said discs are disposed symmetrically in respect to a horizontal medial plane of said fuselage body.

10. An aircraft according to claim 9, wherein said fuselage body has a leading edge which is curved to prevent said edge from affecting a gyroscopic moment.

11. An aircraft according to claim 9, wherein said means include nozzles supported at a periphery of said discs to supply jets or liquid thereto, said nozzles being controlled from said control cabin.

12. An aircraft according to claim 9, wherein said reactors are symmetrically positioned above and below said gyroscopic discs so that a thrust exerted by said reactors is parallel to said gyroscopic discs.

13. An aircraft according to claim 1, and further comprising an erector system to maintain said gyroscopic discs horizontal at all times.

* * * * *